Nov. 14, 1939. H. T. KRAFT 2,180,086
CLUTCH
Filed Dec. 8, 1936

INVENTOR
Herman T. Kraft
BY Evans + McCoy
ATTORNEYS

Patented Nov. 14, 1939

2,180,086

UNITED STATES PATENT OFFICE 2,180,086

CLUTCH

Herman T. Kraft, Akron, Ohio, assignor to The General Tire & Rubber Company, Akron, Ohio, a corporation of Ohio Application December 8, 1936, Serial No. 114,792

18 Claims. (Cl. 192—107)

This invention relates to clutches, and more particularly to improved single plate clutches.

An object of the invention is to provide an improved single plate clutch which will close smoothly, with a gradual engagement of the parts, and which will efficiently transmit a smooth flow of power from a source generating power in impulses, such as an internal combustion engine, with minimum frictional losses.

Another object is to provide such a device having an improved clutch action, and which will not slip when fully engaged and when using only moderate clutch pressure.

A further object is to provide a clutch simple in construction and inexpensive to manufacture, and which is readily adapted for use in connection with automotive vehicles.

Other objects and advantages will become apparent from the following detailed description made in connection with the drawing, in which Figure 1 represents a cross section of a clutch embodying the present invention;

Figure 1:
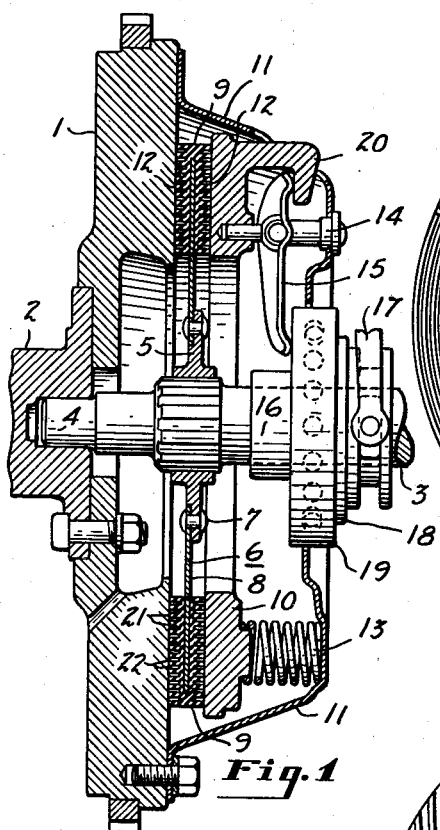

Referring to the drawing by numerals of reference, the clutch comprises a driven flywheel 1 carried by drive shaft 2. The drive shaft is actuated in any suitable manner, and may be the end of an internal combustion engine crankshaft.

Driven shaft 3 is coaxial with the drive shaft 2 and has an end 4 journaled in the drive shaft. Shaft 3 is splined to receive a hub 5, which carries the clutch disk 6 secured thereto by suitable means, such as rivets 7. The clutch disk 6 comprises a circular disk or spider 8, which is preferably made of a tough, sturdy material, such as sheet steel, and a friction element 9 secured to the periphery of the spider. A pressure plate 10, carried by a clutch housing 11, normally presses against the friction element 9 of the clutch disk, so that the friction element is engaged between friction faces 12 of the flywheel 1 and pressure plate 10. The clutch housing 11 is secured to and carried by the flywheel 1 and the resilient force for pressing the friction element between the flywheel and the pressure plate 10 is supplied by springs 13 positioned between the clutch housing and the pressure plate.

The pressure plate 10 is carried in the clutch housing 11 by means of pins 14 rigidly secured in the housing and having sliding engagement with recesses in the pressure plate. Levers 15 are pivotally carried by the pins 14 and are actuated by a flanged sleeve 16 slidably and rotatably carried by the driven shaft 3. The flanged sleeve 16 is moved axially along the shaft 3 by means of a clutch release lever 17 having a bifurcated end which actuates a non-rotatable flanged sleeve 18, the flange of which is separated from the flange of the sleeve 16 by anti-friction means 19. It will be seen that action of the clutch release lever 17 pivots the levers 15 so that they engage overhanging bosses 20 of the pressure plate to compress the springs 13 and release the friction element 9 of the clutch disk 6 from engagement with the friction faces 12.

Figure 2:
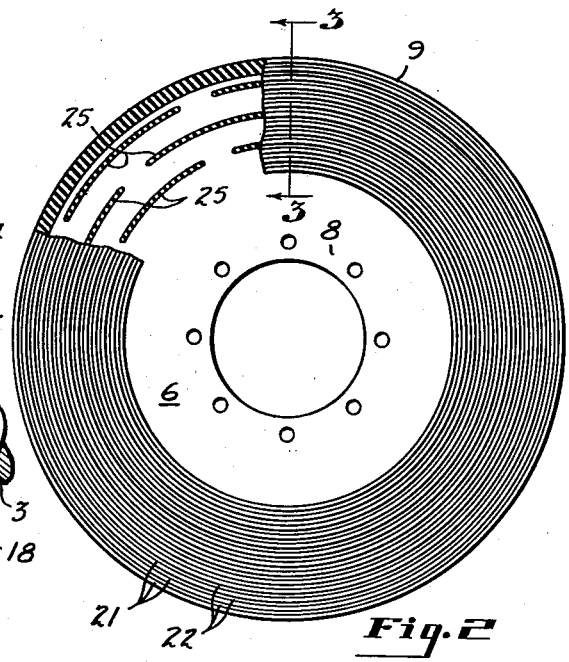
Fig. 2 is a plan view, with part broken away, of my improved clutch plate.

A clutch disk embodying the present invention, and illustrated in Fig. 2, is seen to have a friction element composed of a plurality of endless deformable ribs 21. These ribs are closely spaced and are preferably constructed of a moderately soft, yieldable material, such as rubber compound of substantially the character employed in vehicle tire treads. The ribs are separated from one another by relatively narrow grooves or spaces 22, which are of substantially greater depth than the distance between adjacent ribs. It is also to be observed that each of the ribs is of substantially greater height than thickness, so that individually each rib is relatively weak and unstable, and may be readily deformed.

With a number of the ribs arranged in a closely spaced relation, as mentioned above, and of substantial length, a very efficient and durable friction surface is provided. Although the ribs are individually unstable and readily deformed, having a number of them in closely spaced relation in accordance with the present invention enables them to mutually interact to provide an efficient cushioning and frictional effect.

When a clutch disk having a friction element of this character is engaged between the driven friction faces 12, with a load on the driven shaft 3 to resist the tendency of the clutch disk 6 to rotate the driven shaft, a smoothly engaging clutch action is obtained. It is believed that the effect of providing a plurality of ribs of the character described above affords a clutch action similar to connecting the spider 8 to the friction faces 12 with a number of individual, longitudinally extensible rubber bands. Each of the ribs engages a portion of one of the friction faces 12, so that during differences in angular velocity between the flywheel and clutch disk, each of the ribs may be longitudinally extended; that is to say, it is believed that a portion of the rib engaging the friction face 12 rotates slightly with respect to the base of the rib which is secured to the spider 8. In this manner, although there may be no substantial slipping or sliding between the friction element 9 and friction faces 12, there may be a slight rotation of one relative to the other. Such rotation is, of course, resisted by the inherent resiliency of the individual ribs, so that the tendency of the clutch is to maintain the clutch disk 6 and flywheel 1 in relatively fixed position when the friction element 9 is engaged between the friction faces 12.

Figures 3, 4:
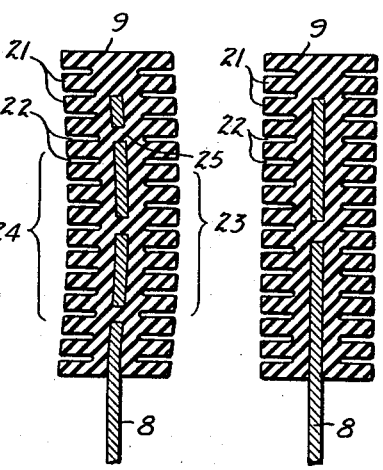
Fig. 3 is a fragmentary sectional view of the clutch plate shown in Fig. 2, taken on the line 3—3 of Fig. 2.
Fig. 4 is a section similar to Fig. 3, showing a modified form of clutch plate construction.

In order that there may be a gradual engagement between the friction element and friction faces, the peripheral portion of the spider 8 is made of spring metal and bowed, as shown in Fig. 3, so that the portion of the friction element lying on one side of the spider for engagement with one of the friction faces 12 is convex and has a raised central portion 23, and is in the form of a section of a circular torus. The portion of the friction element on the opposite side of the spider 8, and for engagement with the other friction face 12, has a depressed or sunken central portion 24, so that this side of the friction element is concave.

When the friction faces 12 engage a friction element of such a bowed construction the entire surface of the friction element will not immediately come into contact with the friction faces, but, instead, the engagement will be gradual, beginning at the outermost and innermost parts of that portion of the friction element which is concave and beginning at the central part of that portion of the friction element which is convex. It is desirable, however, upon maximum pressure of the springs 13 being applied to the pressure plate 10, that all the ribs 21 engage the friction faces 12, and that the driving force transmitted by each of the ribs be substantially uniform. For this reason, and to minimize wear on the portions of the friction element 9 initially engaged by friction faces 12 it is preferable to provide arcuate slits 25 in the marginal bowed portion of the spider 8, so as to increase the flexibility of this part. As shown, the slits may be arranged in concentric rings with the ends of each slit adjacent the center of a slit in the next ring in order to provide sufficient flexibility. In this manner the spider will be flattened out when the friction element is engaged between the friction faces, so that the marginal portion of the spider is no longer bowed.

In certain applications, however, it may be undesirable to bow the marginal portion of the spider, and a satisfactory clutch will be obtained by the use of a flat spider, such as illustrated in Fig. 4. In this case the construction of the friction element and its operation are similar to that above described, except that all of the ribs 21 will be engaged substantially simultaneously by the friction faces 12, and, if desired, the slits 25 may be omitted.

Figure 5:
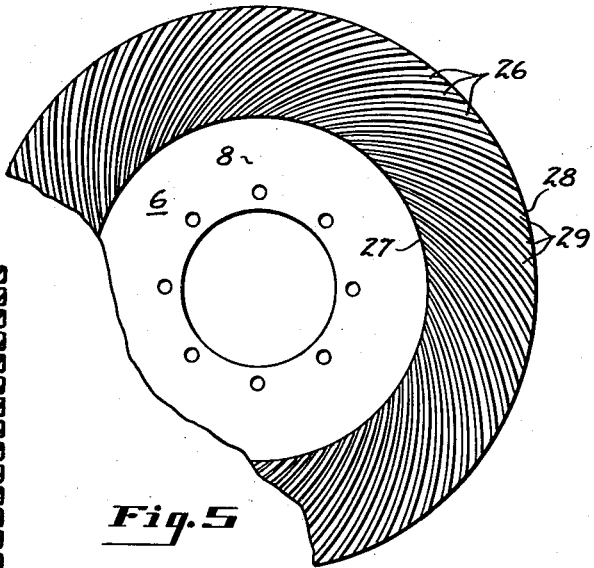
Fig. 5 is a plan view of still another form of clutch plate construction.

In Fig. 5 I have illustrated a modification of the friction element 9 of the clutch disk 6 in which arcuate-shaped ribs 26 replace the endless ribs 21 described above. However, the ribs 26 correspond in other respects to the ribs 21, being closely spaced and individually relatively weak and unstable, so as to be readily deformed. It is to be noted that the ribs 26 are spirally arranged around the periphery of the spider 8, so that each rib gradually curves from inner margin 27 of the friction element to outer margin 28 thereof.

It will thus be seen that the grooves or spaces 29 between the arcuate or spiral ribs 26 extend from the inner margin 27 to the outer margin 28. When the clutch disk is rotated during the operation of the clutch the ribs 26 are, in effect, vanes which cause air to circulate through the spaces 29, which effectively cools the ribs 26 of the friction element, thus providing a self-cooling clutch disk. Any abrasive or foreign material which may be accidentally introduced within the clutch housing 11 and becomes lodged between the friction faces 12 and friction element 9 will, instead of acting as an abrasive to score the friction faces or gouge the clutch disk, become lodged or embedded between the ribs 21 or 26, and thus maintain the contacting parts of the friction faces and ribs substantially free of foreign materials, so that a more efficient clutch action, with less wear on the friction parts, is obtained.

It has been found in operation of a clutch constructed according to the present invention that considerably less pressure is required between the clutch disk and friction faces than with the ordinary type of plate clutch now in common use. It is believed that this is due to the novel action of the deformable ribs to secure a higher coefficient of friction and smoother clutch action.

When using a clutch constructed according to the present invention in connection with an internal combustion engine such as employed in automobiles, the intermittent power impulses of the engine are converted into a smooth, uniform flow of power, with a resultant increase in efficiency of operation. In a single plate clutch of the type now in common use in automobiles, considerable energy may be dissipated in the form of heat when intermittent power impulses are used to actuate such a mechanism requiring a uniform flow of power. However, with a clutch constructed as described above, the individual flexible ribs or vanes act as shock absorbers for the intermittent motor impulses. This causes an alternate storing up and releasing of energy by the clutch, so that energy which would ordinarily be lost as heat is transferred into useful energy.

It will be apparent that one of the advantages of the present invention is in providing a clutch in which the friction element has a yielding surface. This ability to yield readily is of additional importance in the commercial production of clutches, since it is unnecessary to have the several parts in perfect alinement. In the event that on bringing the friction element into engagement with the friction faces one point on the friction element comes into contact with one of the friction faces before any other point, it will yield sufficiently when the clutch is fully engaged to allow a uniform contact between the entire friction element and the friction faces.

Since the present invention provides a friction element for a clutch which has less abrasive effect on the friction faces, such friction faces may be constructed of a material less wear-resistant than cast iron or steel, which are usually employed in present day automotive construction. Thus, aluminum or an aluminum alloy may be used for the normally heavy parts of the clutch in order to provide a light construction. In addition, the use of such metal will afford a more rapid heat conduction, so that such heat as may be generated by the clutch is more rapidly dissipated and a low operating temperature more readily maintained.

Although several embodiments of the invention have been herein shown and described, it will be understood that numerous details of the construction shown may be altered or omitted without departing from the spirit of this invention as defined in the following claims.

What I claim is:

1. A friction clutch having a rotatable driving member, a rotatable driven member, faces on said members, a plurality of closely spaced deformable rubber ribs on one of said faces and arranged to releasably engage another of said faces, said ribs arranged concentrically about the axis of rotation of said members and longitudinally extensible to provide slight angular movement of one member relative to another without slippage of the frictionally engaged parts, said ribs being of greater height than thickness and individually laterally unstable, and adjacent ribs separated by less distance than the depth of the space between the ribs and less distance than the thickness of the ribs whereby adjacent ribs contact one another for mutual support upon lateral bending thereof.

2. A friction clutch having a rotatable driving member, a rotatable driven member, faces on said members, a plurality of closely spaced deformable rubber ribs on one of said faces arranged to releasably engage another of said faces, said ribs arranged spirally about the axis of rotation of the members and relatively unstable, whereby slight angular movement of one member relative to another is provided without slippage of the frictionally engaged parts.

3. A friction clutch having rotatable driving members and a rotatable driven disk, said disk arranged to be releasably engaged between opposed faces of the driving members and including a friction element formed of resilient rubber provided with a plurality of closely spaced deformable rubber projections of greater height than thickness for frictionally engaging the faces, said projections being unstable when engaged between the faces so as to permit slight angular movement between the driven member and driving members without slippage of the projections on the faces.

4. A friction clutch having rotatable driving members and a rotatable driven disk, said disk arranged to be releasably engaged between opposed faces of the driving members and including a friction element formed of resilient rubber provided with a plurality of closely spaced deformable rubber projections of greater height than thickness for frictionally engaging the faces, said projections being separated by distances less than the thickness of the projections and less than the depth of the space between adjacent projections.

5. A friction clutch having rotatable driving members and a rotatable driven disk, said disk arranged to be releasably engaged between opposed faces of the driving members and including a friction element formed of resilient rubber provided with a plurality of closely spaced deformable rubber ribs of greater height than thickness for frictionally engaging the faces, said ribs being separated by distances less than the thickness of the ribs and less than the depth of the space between adjacent ribs.

6. A friction clutch having rotatable driving members and a rotatable driven disk, said disk arranged to be releasably engaged between opposed faces of the driving members and provided with a plurality of closely spaced deformable rubber ribs for frictionally engaging the faces, said ribs separated by distances less than the thickness of the ribs and less than the depth of the space between adjacent ribs, and said disk and faces arranged so that progressively larger proportions of the ribs frictionally engage the faces as the driving and driven members are engaged.

7. A friction clutch having rotatable driving members and a rotatable driven disk, said disk arranged to be releasably engaged between opposed faces of the driving members and provided with a plurality of closely spaced deformable rubber ribs for frictionally engaging the faces, said ribs separated by distances less than the thickness of the ribs and less than the depth of the space between adjacent ribs, and the engaged portion of said disk radially bowed and resilient, whereby initial engagement is between progressively increasing proportions of the ribs and faces.

8. A friction clutch having rotatable driving members and a rotatable driven disk, said disk arranged to be releasably engaged between opposed faces of the driving members and including a friction element formed of resilient rubber provided with a plurality of closely spaced deformable rubber ribs of greater height than thickness for frictionally engaging the faces, said ribs being separated by distances less than the thickness of the ribs and less than the depth of the space between adjacent ribs, and the engaged portion of said disk having a core portion formed of spring metal, radially bowed and provided with arcuate slots, whereby initial engagement is between progressively increasing proportions of the ribs and faces.

9. A friction clutch having rotatable driving members and a rotatable driven spring metal disk, said disk arranged to be releasably engaged between opposed faces of the driving members and having an annular marginal portion to which is secured a resilient rubber friction element provided with a plurality of closely spaced deformable rubber ribs for frictionally engaging the faces, said ribs separated by distances less than the thickness of the ribs and less than the depth of the space between adjacent ribs, and said disk radially bowed at said annular marginal portion.

10. A clutch disk comprising a plate having a peripheral friction element secured thereto and formed of a resilient rubber composition, said element having integral therewith a multiplicity of closely spaced longitudinally extensible, deformable ribs for frictional engagement with a clutch face, said ribs being substantially annular in extent and separated from one another by less distance than the depth of the space between adjoining ribs and arranged in substantially concentric relation with one another, the ribs being distortable to permit slight relative motion between the disk and the face without slippage of the ribs on the face.

11. A clutch disk comprising a plate having a peripheral friction element secured thereto and formed of a resilient rubber composition, said element having integral therewith a multiplicity of closely spaced longitudinally extensible ribs arranged for frictional engagement with a clutch face, said ribs being substantially annular in extent and individually relatively unstable and able to collectively withstand normal clutch pressures, the ribs being formed of relatively soft and elastic material and having substantially greater depth than thickness to permit lateral flexing thereof during engagement of the disk with a clutch face.

12. A clutch disk comprising a plate having a peripheral friction element of resilient rubber composition, closely spaced relatively soft rubber annular ribs formed on the friction element and integral therewith for engagement with a clutch face, said ribs being substantially concentric with respect to the axis of rotation of the disk and the ribs being of greater depth than thickness to permit flexing of the ribs without substantial slipping thereof during engagement of the disk with a clutch face.

13. A clutch disk comprising a plate having a peripheral friction element of resilient rubber composition, closely spaced relatively soft rubber annular ribs formed on the friction element and integral therewith for engagement with a clutch face, said ribs being separated from one another by distances less than the depth of the spaces between the ribs, and the ribs being of greater depth than thickness.

14. A clutch disk comprising a plate having a peripheral friction element of resilient rubber composition, closely spaced relatively soft rubber ribs formed on the friction element and integral therewith for engagement with a clutch face, said ribs separated from one another by distances less than the thickness of the ribs, said distances being less than the depth of the spaces between the ribs and the thickness of the ribs being less than the depth of the ribs.

15. A clutch disk comprising a plate having a peripheral friction element of resilient rubber composition, ribs formed on opposite sides of the friction element and integral therewith for engagement between opposed clutch faces, said ribs being of greater depth than thickness and closely spaced to collectively withstand normal clutch pressures.

16. A clutch disk comprising a plate having a peripheral friction element of resilient rubber composition, said element being integral on both sides of the plate and having portions extending through openings in the plate to secure the element to the plate, ribs formed on opposite sides of the friction element and integral therewith for engagement between opposed clutch faces, said ribs being of greater depth than thickness and closely spaced to collectively withstand normal clutch pressures.

17. A friction clutch comprising a rotatable driving member and a rotatable driven member, one of said members having a friction face and the other having a resilient rubber friction element, said element having integrally formed thereon a plurality of closely spaced deformable rubber ribs for frictionally engaging said face, the ribs being of annular extent and separated by distances less than the depth of the spaces between ribs whereby each rib is separated from adjoining ribs and laterally relatively unstable, the deformation of the ribs permitting slight angular movement of one member with respect to the other without substantial slippage between the ribs and face, and means for engaging and disengaging the members.

18. A friction clutch comprising a rotatable driving member and a rotatable driven member, one of said members having a friction face and the other having a resilient rubber friction element, said element having integrally formed thereon a plurality of closely spaced deformable rubber ribs for frictionally engaging said face, the ribs separated by distances less than the depth of the spaces between ribs whereby each rib is separated from adjoining ribs and laterally relatively unstable, the deformation of the ribs permitting slight angular movement of one member with respect to the other without substantial slippage between the ribs and face, said ribs being substantially concentric with the axis of rotation of the member and substantially annular in extent whereby the element engages a plurality of substantially circular concentric portions of the face.

HERMAN T. KRAFT.